United States Patent
Jockusch et al.

(10) Patent No.: US 10,018,823 B2
(45) Date of Patent: Jul. 10, 2018

(54) FORCE-FEEDBACK CONTROL DEVICE AND METHOD FOR DIGITAL MICROSCOPE

(71) Applicant: Carl Zeiss Microscopy GmbH, Jena (DE)

(72) Inventors: Wolf Jockusch, Gottingen (DE); Robert Schrem, Stuttgart (DE); Peter Weber, Altensteig (DE); Alexander Gaiduk, Jena (DE); Dominik Stehr, Jena (DE); Benno Radt, Jena (DE); Markus Gnauck, Jena (DE)

(73) Assignee: Carl Zeiss Microscopy GMBH, Jena (DE)

( * ) Notice: Subject to any disclaimer, the term of this patent is extended or adjusted under 35 U.S.C. 154(b) by 287 days.

(21) Appl. No.: 14/254,070

(22) Filed: Apr. 16, 2014

(65) Prior Publication Data

US 2014/0313311 A1 Oct. 23, 2014

(30) Foreign Application Priority Data

Apr. 19, 2013 (DE) .................. 10 2013 007 000

(51) Int. Cl.
  *G02B 21/24* (2006.01)
  *G02B 21/36* (2006.01)
  *H04N 5/232* (2006.01)

(52) U.S. Cl.
  CPC ........... *G02B 21/365* (2013.01); *G02B 21/24* (2013.01); *H04N 5/23216* (2013.01)

(58) Field of Classification Search
  CPC .................. G02B 21/365; G02B 21/24
  See application file for complete search history.

(56) References Cited

U.S. PATENT DOCUMENTS

| 5,557,456 A | 9/1996 | Garner et al. |
| 7,031,056 B2 * | 4/2006 | Peter ................. G05G 1/10 |
| | | 359/392 |

(Continued)

FOREIGN PATENT DOCUMENTS

| DE | 102 59 009 | 7/2004 |
| DE | 103 14 752 | 10/2004 |

(Continued)

OTHER PUBLICATIONS

Sierra et al. Force-feedback joystick as a low-cost haptic interface for an atomic-force-microscopy nano-manipulator, Mar. 5, 2003.*

(Continued)

*Primary Examiner* — Jay Patel
*Assistant Examiner* — Irfan Habib
(74) *Attorney, Agent, or Firm* — Nixon Peabody LLP; Jeffrey L. Costellia

(57) ABSTRACT

The invention relates to a control device and to a method for controlling a motorized digital microscope. The control device comprises at least one first module (01) for controlling the hardware, the software and the work flow of the digital microscope during the examination of a specimen. According to the invention, the first module (01) comprises a first input means (02, 16) having force feedback for controlling functions of the digital microscope. In a method according to the invention, data input takes place via a first input means, wherein force feedback is generated via the success or progression of the input.

11 Claims, 3 Drawing Sheets

(56) References Cited

U.S. PATENT DOCUMENTS

| | | | |
|---|---|---|---|
| 7,518,745 B2* | 4/2009 | Guerraz | G06F 3/016 345/156 |
| 8,154,537 B2 | 4/2012 | Olien | |
| 8,175,512 B2 | 5/2012 | Cornwell | |
| 8,248,363 B2* | 8/2012 | Anastas | G06F 3/016 345/156 |
| 8,482,852 B2* | 7/2013 | Schadwinkel | G02B 21/242 359/383 |
| 8,487,873 B2* | 7/2013 | Rosenberg | A63F 13/06 345/161 |
| 8,830,161 B2* | 9/2014 | Grant | G06F 3/016 345/156 |
| 9,086,740 B2* | 7/2015 | Furukawa | G06F 3/0338 |
| 9,367,151 B2* | 6/2016 | McKillop | G06F 3/03547 |
| 2005/0111087 A1 | 5/2005 | Knoblich et al. | |
| 2005/0203684 A1* | 9/2005 | Borgesson | B60K 35/00 701/36 |
| 2006/0173244 A1* | 8/2006 | Boulais | A61B 1/00085 600/156 |
| 2007/0279401 A1* | 12/2007 | Ramstein | G06F 3/016 345/184 |
| 2009/0046054 A1 | 2/2009 | Olien | |
| 2009/0052022 A1 | 2/2009 | Wagener et al. | |
| 2009/0168161 A1* | 7/2009 | Guiney | G02B 21/367 359/391 |
| 2010/0079399 A1* | 4/2010 | Ma | G06F 3/016 345/174 |
| 2010/0079415 A1* | 4/2010 | Yang | G01C 21/3664 345/184 |
| 2010/0156818 A1 | 6/2010 | Burrough et al. | |
| 2011/0013010 A1 | 1/2011 | Shirota et al. | |
| 2011/0038041 A1 | 2/2011 | Schadwinkel et al. | |
| 2011/0149387 A1* | 6/2011 | Sukekawa | G02B 21/241 359/368 |
| 2011/0260990 A1 | 10/2011 | Ali et al. | |
| 2012/0044342 A1* | 2/2012 | Hing | G02B 21/361 348/79 |
| 2012/0120224 A1* | 5/2012 | Zuest | G02B 21/0016 348/79 |
| 2013/0063585 A1* | 3/2013 | Watanabe | G02B 21/367 348/79 |
| 2013/0076888 A1* | 3/2013 | Hibino | G02B 21/025 348/79 |
| 2014/0327757 A1* | 11/2014 | Shen | G02B 21/368 348/79 |

FOREIGN PATENT DOCUMENTS

| | | |
|---|---|---|
| DE | 10332468 | 2/2005 |
| DE | 103 55 526 | 6/2005 |
| DE | 10 2006 010 104 | 8/2007 |
| DE | 10 2006 010 104 A1 | 8/2007 |
| DE | 10 2007 039 450 | 2/2009 |
| DE | 10 2007 045 669 | 4/2009 |
| DE | 10 2007 045 669 A1 | 4/2009 |
| DE | 10 2010 063 392 | 5/2012 |
| DE | 10 2010 063 392 A1 | 5/2012 |
| DE | 10 2011 017 250 | 7/2012 |
| EP | 2 339 388 A1 | 6/2011 |
| WO | WO 2004-055572 A1 | 7/2004 |
| WO | WO 2004/055572 A1 | 7/2004 |
| WO | WO 2009-023395 A1 | 2/2009 |
| WO | WO 2009/023395 A1 | 2/2009 |

OTHER PUBLICATIONS

Rubio-Sierra, Francisco J., et al. "Force-feedback joystick as a low-cost haptic interface for an atomic-force-microscopy nanomanipulator." *Applied Physics A* 76.6 (2003): 903-906.

Minsky, Margaret, et al. "Feeling and seeing: issues in force display." *ACM SIGGRAPH Computer Graphics* 24.2 (1990): 235-243.

Pacoret, Cécile, et al. "Touching the microworld with force-feedback optical tweezers." *Optics express* 17.12 (2009): 10259-10264.

Search Report, German Patent and Trademark Office, German Patent Application No. 10 2013 007 000.7, dated Jun. 10, 2013.

Minsky, Margaret, et at. "Feeling and seeing: issues in force display," ACM SIGGRAPH Computer Graphics 24.2 (1990): 235-241.

* cited by examiner

FORCE-FEEDBACK CONTROL DEVICE AND METHOD FOR DIGITAL MICROSCOPE

FIELD

The invention relates to a control device and to a method for controlling a motorized digital microscope.

BACKGROUND

Depending on use and the particular application, microscopes, in particular digital microscopes, have a number of parameters that must be changed, adapted and monitored as part of the operation and control. In a conventional light-optical microscope, for example, the options of optimizing observation include setting the focus, changing the magnification, changing and selecting contrast and illumination methods, light control, displacement of the object and further functions.

Numerous uses for controlling image display devices and microscopes are known from the prior art.

In the field of microscopy, DE 10332468 B4, for example, describes a microscope comprising an eyepiece, in which the operating parameters and operating modes of the microscope can be set by way of an operating device. The operating device comprises coaxial adjusting knobs for positioning the object, switches for setting the lamp brightness and for changing the object lens. The operating device is provided separately from the microscope. A display unit having an operating interface is integrated into the microscope stand.

DE 102006 010 104 A1 describes a modular operating unit for a microscope, comprising a display unit for desired and actual settings and operating elements for predefining desired settings. For this purpose, rotary transducers, keys, slide controls, scroll wheels and touch screens as well as acoustic signal output may be used. The operating unit can be assembled from individual modules as needed.

Microscope systems are known from U.S. 2011 0013010 A1, U.S. 2011 0149387 A1 and DE 10 2010 063 392 A1, for example, in which user entries for controlling the microscope are made via a touch screen.

From U.S. Pat. No. 5,557,456 a control device for controlling the position of a motorized microscope stage in three axes of the Cartesian coordinate system is known. By way of three knobs, the stage can be controlled in three degrees of freedom so as to be able to correctly set the focus and image section.

SUMMARY

It is the object of the invention to design the operation and control of a digital microscope in a way that is as user-friendly as possible and adaptable to the respective required conditions, and to provide a control device and a method therefor.

The object is achieved according to the invention by a control device for controlling a motorized digital microscope having the features of claim 1, and by a method for controlling a digital microscope using such a control device according to claim 9.

A control device for a digital microscope according to the invention preferably has a modular design and is used to fully control the microscope hardware, the software and the work flow during the examination of a specimen by way of the microscope. No mechanical or electronic elements are present in the microscope stage, which allow the user to change settings and parameters of the work flow. This is only possible by way of the modular control device.

The control device comprises at least one first input means for controlling functions of the digital microscope (software and hardware functions). According to the invention, the first input means has force feedback, which supplies the user with tactile information about operating and setting details, for example when a stop has been reached, the speed for setting and further information. During the operation of the microscope, the user can thus concentrate better on observing the specimen since he is provided with relevant force feedback via the input means, for example when setting a magnification, and no visual monitoring is required for this with frequent adjustments.

The control device is used to control the entire microscope hardware, including the relative positioning of the optical axis and of the specimen. Various reference coordinate systems can be selected and commands executed. Movements can be set, for example, as translational movements in the Cartesian coordinate system, as rotations or as inclinations.

Certain software functions of the digital microscope can preferably also be dynamically defined by the user by way of the control device.

Control of an image processing unit integrated in the microscope is likewise possible by way of the control device.

The control device preferably has two operating modes:
Data acquisition mode: The control device allows all microscope hardware functions and data acquisition to be controlled. This mode requires interaction between the user and the data acquisition software.
Data representation mode: The control device is used as an input device for operating the software.
Control of the microscope hardware function comprises:
controlling the X and Y positions of a specimen stage;
controlling the zoom setting (magnification factor);
controlling the focus of the object lens (Z position of the specimen stage or distance between the specimen stage and the object lens);
triggering the image or video recording or acquisition and controlling the parameters of the recording.

The control device can be coupled to the digital microscope by way of a cable or in a cordless manner. In the cordless variant, the control device comprises a preferably rechargeable battery. In various embodiments of the invention, output means and additional input means can be integrated in the control device.

The control device comprises at least the above-described different functional units, which are disposed in a first module.

The first input means is used to control the microscope functions, at least in the data acquisition mode.

In a first preferred embodiment, the first input means is a dual rotary/push operating knob having force feedback, wherein a first knob and a second knob are coaxially disposed. Dual operating knobs without force feedback are common in microscopy and are known to a person skilled in the art.

Force feedback wheels are mentioned in various fields of application in the prior art, for example in U.S. Pat. Nos. 8,175,512 B2 or 8,154,537 B2.

With a dual operating knob, for example, the lower wheel is used to set the X position of the specimen stage and/or the focus of the object lens, and the upper wheel is used to set the Y position of the specimen stage and/or the zoom area of the object lens.

Force feedback enormously facilitates operation since the user directly senses what input he is making and can therefore focus entirely on viewing the image.

The feedback functions are preferably defined by way of software and adaptable in a user-specific manner.

During the rough adjustment of the X and Y positions, preferably slight force feedback occurs with fast continuous turning of the operating knob, while medium feedback occurs during the fine adjustment using slow turning. Once the positioning boundaries have been reached, the knob preferably cannot be turned further. The settings for the force feedback can preferably be made by way of software.

When setting the zoom, stepped or continuous force feedback can occur, for example when turning the knob, depending on whether the optical zoom or digital zoom is adjusted in steps or continuously.

Brief higher force feedback could occur, for example, when a switch is made from preview to optical zoom, or from optical zoom to digital zoom. Stop feedback can occur when the lowest magnification (complete preview image) or maximal magnification is set.

When setting the focus, the force feedback can occur analogously to the zoom settings, which is to say in steps or continuously when turning the knob. When the boundaries for adjusting the specimen stage in the Z direction have been reached, the force feedback becomes a stop function, so that the knob cannot be turned further.

In this embodiment, the first module can comprise a second or additional input means. The second input means is a keyboard, a touch display or a multi touch pad, for example.

In alternative embodiments, second and additional modules having input and/or output means can be coupled to the first module so as to adapt the functional scope of the control device to the specific features of the digital microscope and the user needs. This coupling can take place with the aid of mechanical and/or magnetic means. The data exchange between the first and the optionally additional modules can take place wirelessly or by wire. A person skilled in the art will be able to configure both the mechanical and the electrical coupling of the module.

A keyboard can be used as an additional input means, for example, providing functions to operate the hardware and software of the digital microscope, in particular for text entries in the software. The keyboard can be coupled to the first module as a second module.

A multi touch pad can also be used as the input means, which then assumes the functions of a mouse in the software operation and the operation of microscope-specific functions. The selection of the functions that are possible in this regard is dependent on the operating mode that is set. The multi touch pad can also have force feedback if it is used as the first input means.

The multi touch pad can be used, for example, to carry out the functions listed hereafter.

In the data acquisition mode, cursor movements can take place by way of a one finger slide, left mouse click or left double click by way of one finger click, and a right mouse click by way of 2+1 finger tap (let go one of two fingers) for software operation, and zoom functions by way of 2 finger pinch, movements of the microscope stage by way of 3 finger slide, and settings of the luminous intensity by way of lateral slides.

In the data representation mode, the control of the microscope hardware is preferably inactive. Mouse movements and mouse clicks, zoom and various movements in the image are possible analogously to the above-described functions.

In one further preferred embodiment, the first input means is a multi touch screen having force feedback. Such systems are analyzed or proposed in "Feeling and Seeing: Issues in Force Display", Margaret Minsky et. al., 1990 ACM, or in "Haptische Touchpad zur Infotainmentbedienung" (Haptic touch pad for infotainment operation), Alexander Peters et. al. in i-com Praxisberichte January 2010, for example. Additional input and output means can, of course, be disposed in the first or in additional modules in this embodiment.

Likewise, a simple touch screen can be present as the input means. Such a touch screen allows the user to quickly and easily access hardware and software functions, which are represented as icon-like knobs or touch screens. The user can preferably select the respective required functions from a predefined list. This selection can be accessed by way of the microscope software. As a result, an application-based menu can also be designed as a function of various functions. Typical functions for this can be: Snap, liveVideo, high dynamic range (HDR) mode, autofocus (AF), extended depth of field (EDoF) mode, real-time extended depth of field (liveEDoF) mode, 3D, stitching, BestShot, BF (bright field illumination), DF (dark field illumination), MixF (mixed illumination), segmented illumination, brightness control and the like.

Preferred embodiments of a control device according to the invention and variants will be described in more detail hereafter based on the drawings.

DETAILED DESCRIPTION

Figure 1:
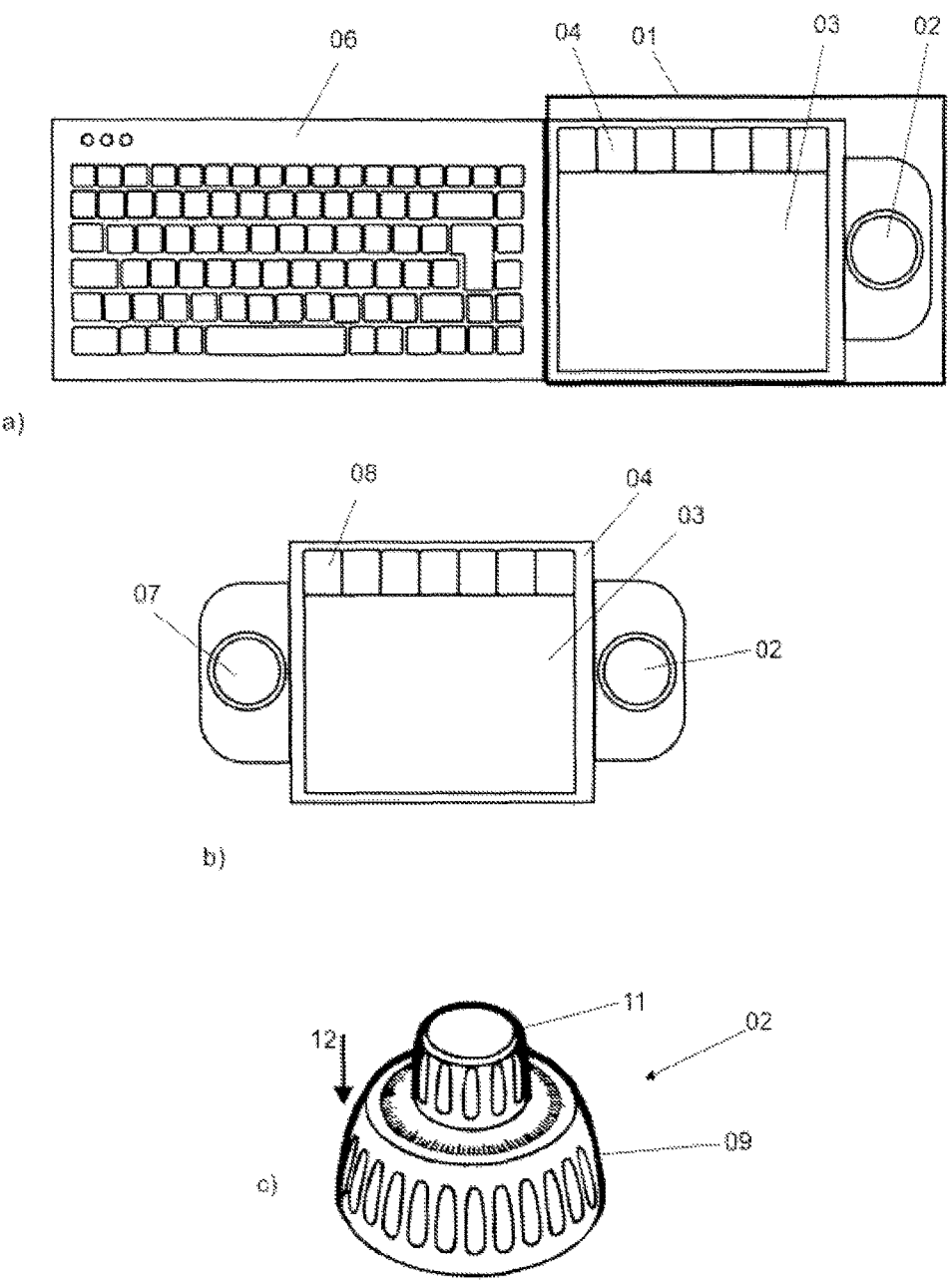
FIG. 1: shows a first preferred embodiment of a control device comprising a rotary/push operating knob having force feedback.

FIG. 1 shows a schematic illustration of a first preferred embodiment of a control device according to the invention. The control device includes a first module 01 comprising a rotary/push operating knob 02 having force feedback as a first input means, a touch pad 03 as a second input means and a touch display 04 as a combined input/output means. A keyboard 06 is removably coupled to the first module 01, so that the keyboard can be used as needed (FIG. 1a).

FIG. 1b shows the first module 01 in an enlarged view, with the option of coupling a second operating knob 07 to the first module 01 instead of the keyboard 06 (shown with dotted line). The second operating knob 07 can be equipped with or without force feedback. Such a system can be used, for example, to set the zoom and specimen stage using two hands.

The touch display 04 in this embodiment includes seven areas 08, which can be assigned freely definable shortcuts and the corresponding icons. Depending on the operating mode and application, the representations on the touch display 04 will differ.

FIG. 1c shows the rotary/push operating knob 02 in an enlarged view. The operating knob 02 comprises a lower wheel 09 and an upper wheel 11. The lower wheel 09 preferably has a push function (arrow 12). In this way, inputs can be confirmed by way of a click, or certain inputs can be made in the depressed state by way of turning. The individual above-described force feedback forms are not apparent from this illustration. The operating knob, of course, includes actuators for implementing such feedback.

Figure 2:
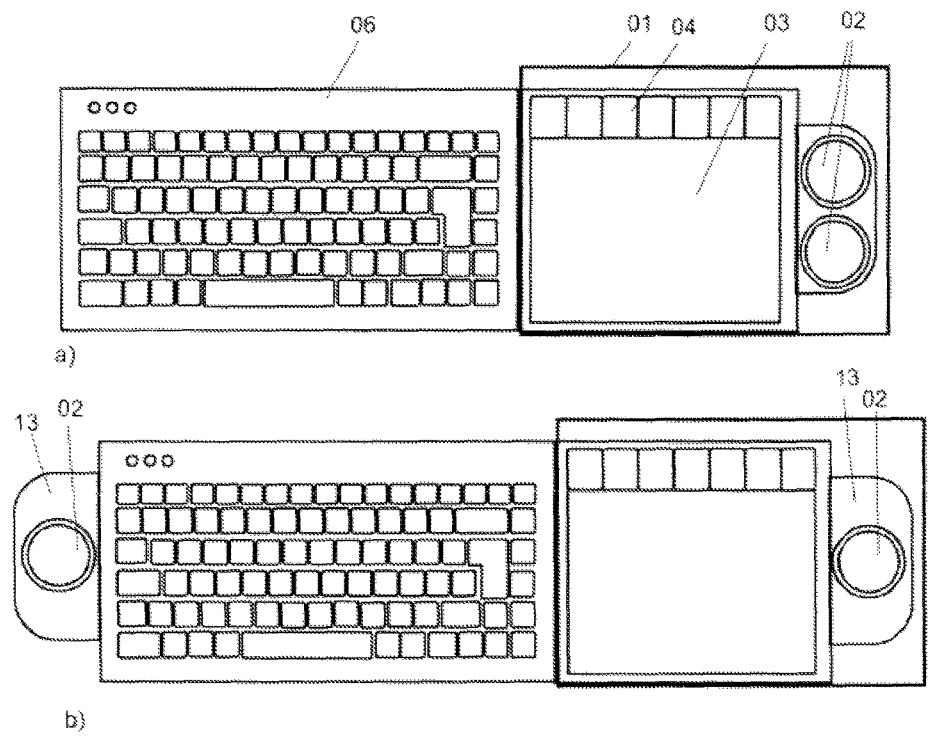
FIG. 2: shows a second preferred embodiment of a control device comprising two rotary/push operating knobs having force feedback.

FIG. 2 shows a second preferred embodiment of the control device, comprising two rotary/push operating knobs 02 having force feedback. The rotary/push operating knobs 02 can both be disposed in the first module 01 (FIG. 2a), or on both sides of the outsides of the control device (FIG. 2b), which also comprises a keyboard 06, which is removable as described above. The operating knobs 02 are disposed in so-called side modules 13.

Figure 3:
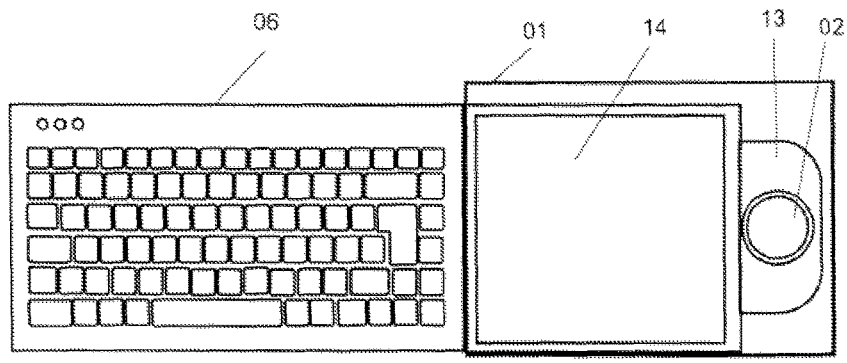
FIG. 3: shows a third preferred embodiment of the control device comprising a multi touch screen.

In the third preferred embodiment shown in FIG. 3, a multi touch screen 14 is provided in the first module 01 and here performs a multi touch pad function and can represent a situational menu with the necessary knobs and/or controls or the like. Here, the multi touch screen 14 assumes the function of an input/output means. The keyboard 06 is provided to the left of the module 01 here as well. However, alternatively (such as for left-handed users), it is possible to provide the side module 13 to the left of the multi touch screen 14 and the keyboard 06 to the right thereof.

Figure 4:
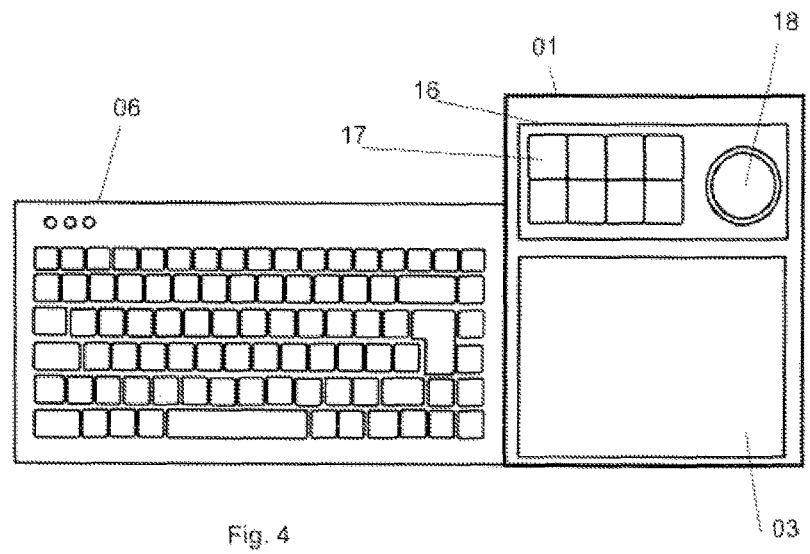
FIG. 4: shows a fourth preferred embodiment of the control device comprising a multi touch screen having force feedback.
Figure 5:
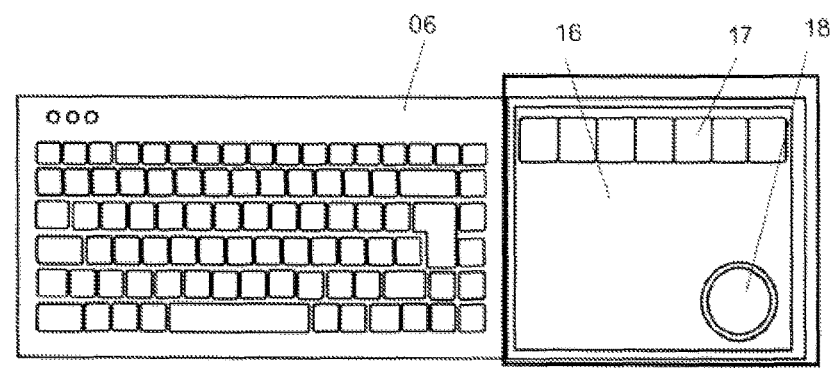
FIG. 5: shows a fifth preferred embodiment of the control device comprising a multi touch screen having force feedback for various zones of the multi touch screen.

In the embodiments shown in FIGS. 4 and 5, the first module 01 comprises a multi touch screen 16 having force feedback as the first input means. The free definable knobs are provided on this screen in the areas 17, and an operating knob 18, which is implemented by way of software, is provided in this exemplary embodiment. Due to the software implementation, this knob can, of course, be designed freely, for example as a dual slide control, dual rotary/push knob or the like. The force feedback can be implemented here anywhere on the multi touch screen, which is to say in the areas 17 (virtual knobs), on the virtual operating knob 18 and, in each case, application-based by way of software. The embodiment in FIG. 4 includes the multi touch pad 03, the function of which is also performed by the multi touch screen 16 in the embodiment shown in FIG. 5 by way of software definition.

Figure 6:
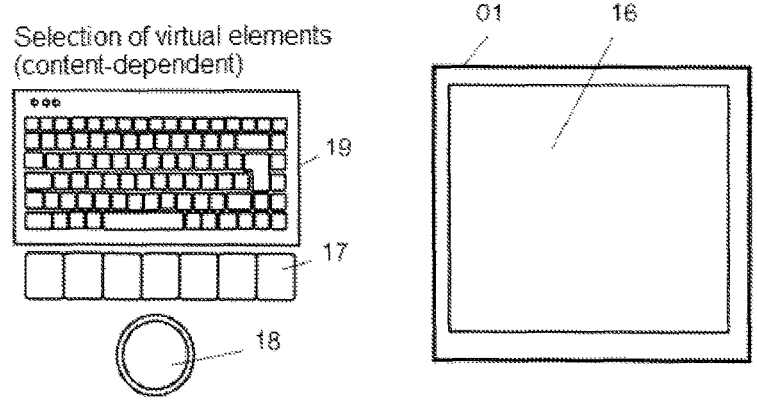
FIG. 6: shows a sixth preferred embodiment of the control device comprising a multi touch screen having force feedback for various zones of the multi touch screen.

In the sixth preferred embodiment of the control device shown in FIG. 6, the first module comprises the multi touch screen 16 having force feedback for a virtual keyboard 19 and virtual knobs 17 and 18.

The different modules can be adapted to the respective requirements and customer needs. Further combinations of input/out means and implementations and software variants are possible, of course, to produce the control device according to the invention.

LIST OF REFERENCE NUMERALS 01 first module
02 operating knob
03 touch pad
04 touch screen
05 —
06 keyboard
07 second operating knob
08 area
09 lower wheel
10 —
11 upper wheel
12 push function
13 side module
14 multi touch screen
15 —
16 multi touch screen having force feedback
17 virtual knobs
18 virtual dual rotary/push operating knob
19 virtual keyboard

The invention claimed is:

1. A control device for controlling a motorized digital microscope, comprising at least one first module configured to control a hardware, a software and work flow of the digital microscope during an examination of a specimen,
wherein the first module comprises a first input means comprising an operating knob having at least one of a rotary and a push function and having force feedback, wherein the force feedback is provided once digital boundaries are reached during the examination of the specimen and when the input is varied in speed, wherein the force feedback due to reaching the digital boundaries restrict the handling of the operating knob at a user input, wherein a first force feedback occurs with fast continuous turning of the operating knob, while a second force feedback occurs during the fine adjustment using slow turning of the operating knob, wherein the second force feedback is stronger than the first force feedback, and
wherein controlling the motorized digital microscope comprises controlling of at least two of functions of a motorized digital microscope by giving force feedback to the user, selected from: controlling positions of a specimen stage, controlling a zoom setting, controlling a focus of an object lens, triggering an image or video recording, controlling parameters of video recording, and controlling illumination.

2. The control device according to claim 1, wherein the push function is configured to control the microscope hardware.

3. The control device according to claim 2, wherein the operating knob is a coaxial rotary/push operating knob.

4. The control device according to claim 1, wherein the first input means comprising a touch screen or a multi touch screen having force feedback.

5. A control device according to claim 1 further comprising a second input means.

6. The control device according to claim 5, wherein the second input means is a keyboard.

7. The control device according to claim 5, wherein the second input means is releasably connected to the first module.

8. The control device according to claim 5, wherein the second input means is a touch screen, the active areas of which are freely defined by way of software functions.

9. A control device according to claim 1, further comprising a display means.

10. A method for controlling a motorized digital microscope, wherein a control of hardware functions, of software functions and of work flow of the digital microscope takes place via data input by way of a first input means, wherein force feedback is generated via the success or progression of the data input, wherein the force feedback is provided once digital boundaries are reached and when the first input means is varied in speed, wherein the force feedback due to reaching the digital boundaries restrict handling of the first input means, wherein a first force feedback occurs with fast continuous turning of the operating knob, while a second force feedback occurs during the fine adjustment using slow turning of the operating knob, wherein the second force feedback is stronger than the first force feedback, and wherein controlling the motorized digital microscope comprises controlling at least two of the functions of the digital microscope, selected from controlling positions of the specimen stage, controlling a zoom setting, controlling focus of an object lens, triggering an image or video recording, controlling parameters of the video recording, and controlling illumination.

11. A method for controlling the motorized digital microscope according to claim 10, wherein different force feedback functions for different controls of the microscope hardware are defined by way of the software functions.

* * * * *